Feb. 14, 1933. W. G. FRITTS 1,897,425
TIRE CUTTING MACHINE
Filed Aug. 27, 1930 2 Sheets-Sheet 1
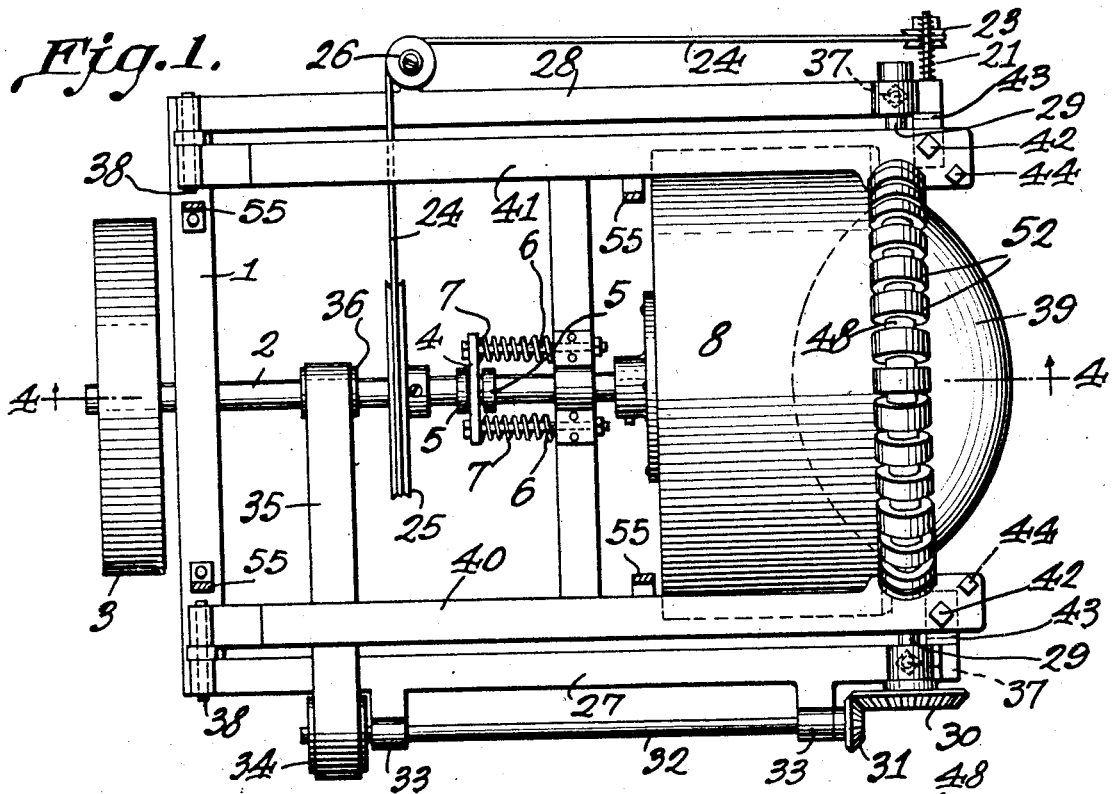
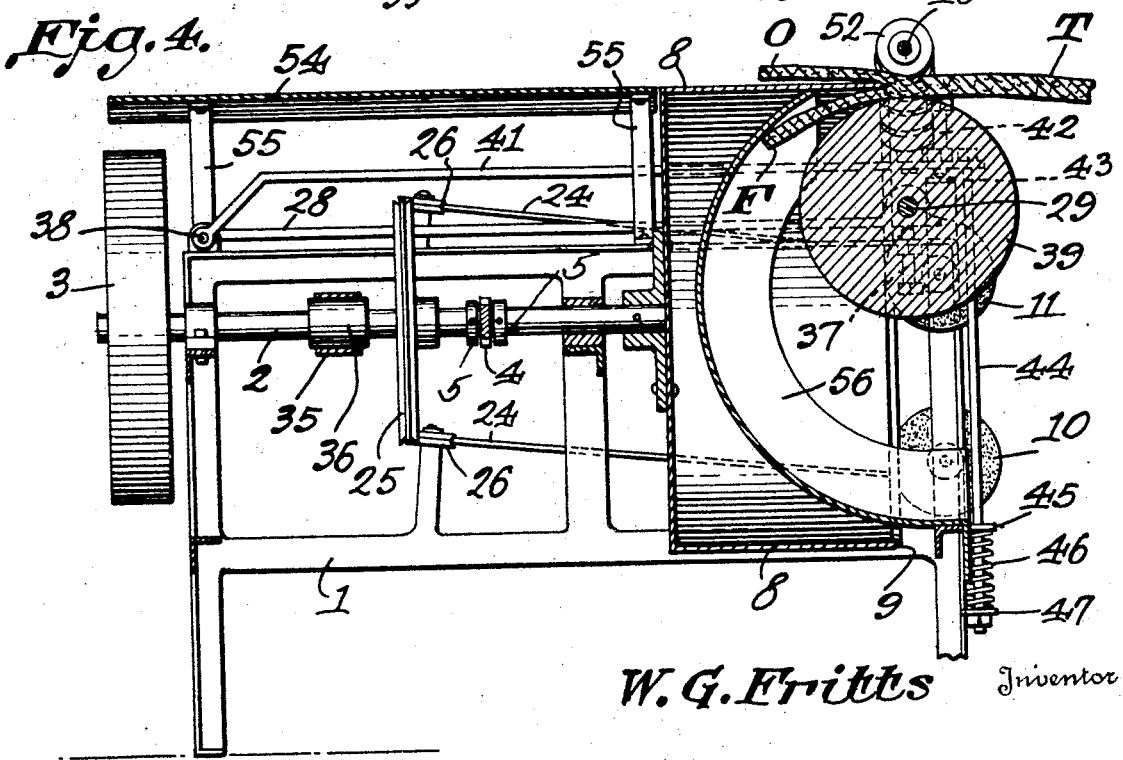
W. G. Fritts Inventor
By C. A. Snow & Co.
Attorneys.

Feb. 14, 1933.  W. G. FRITTS  1,897,425
TIRE CUTTING MACHINE
Filed Aug. 27, 1930   2 Sheets-Sheet 2
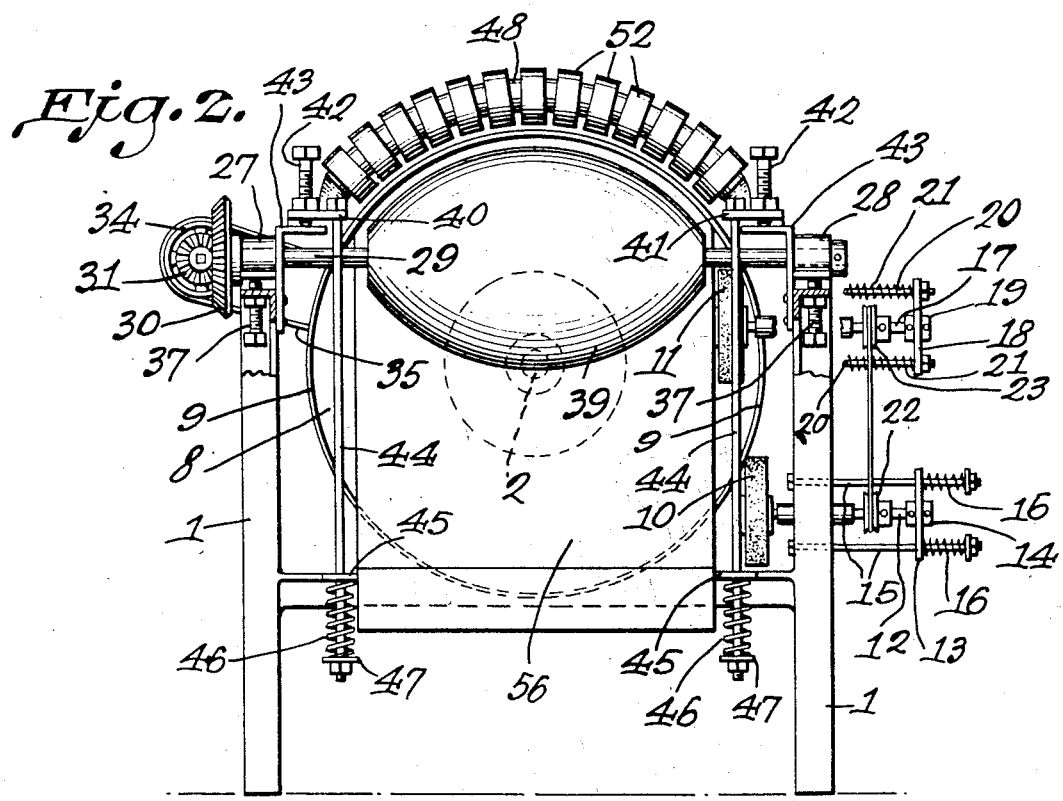
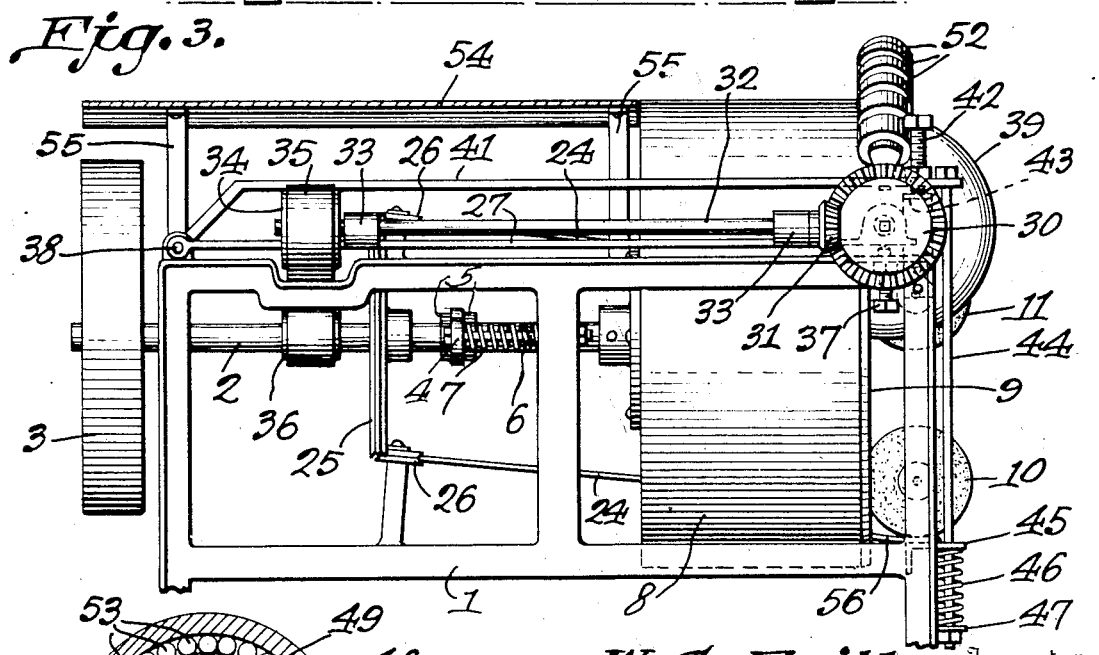
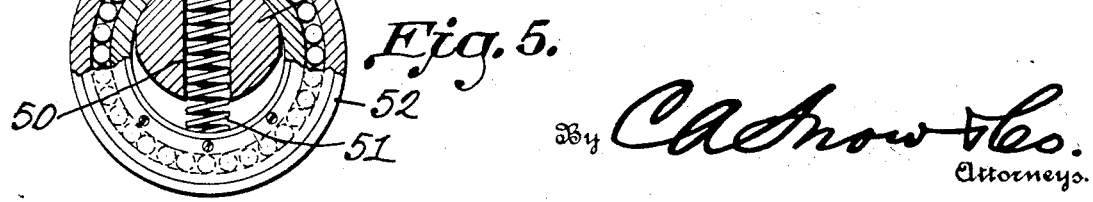

Patented Feb. 14, 1933

1,897,425

UNITED STATES PATENT OFFICE

WILFRED GUY FRITTS, OF LEXINGTON, NORTH CAROLINA

TIRE CUTTING MACHINE

Application filed August 27, 1930. Serial No. 478,239.

This invention relates to a machine designed primarily for reclaiming the fabric portions of automobile tires so that they can be used in the manufacture of tire patches and other articles.

It is an object of the invention to provide a simple, compact and efficient machine which will quickly cut off the rubber tread, deliver it in strip form from one part of the machine while the inner fabric containing portion of the tire is delivered at another point in strip form.

A further object is to provide a tire cutting machine which will hold the tire firmly in position while being presented to the cutter, thereby to insure a smooth accurate cut.

Another object is to provide means whereby the cutter can be sharpened during the cutting operation so that practically continuous cutting can be effected.

Another object is to provide a machine which is adjustable readily for use in cutting tires of different sizes and thicknesses.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings:

Figure 1 is a plan view of the machine.
Figure 2 is a front elevation.
Figure 3 is a side elevation.
Figure 4 is a section on line 4—4, Figure 1.
Figure 5 is an enlarged section through a portion of the presser.

Referring to the figures by characters of reference, 1 designates the main frame of the machine in which is journaled the drive shaft 2 which is adapted to receive motion through a pulley 3 from any suitable source. This shaft has a limited sliding movement in the direction of its length but this movement is normally resisted by a cross head 4 through which the shaft extends, there being collars 5 secured to the shaft at opposite sides of the cross head. Rods 6 are fastened to frame 1 and carry springs 7 which bear against the cross head and act to press shaft 2 normally toward the front end of the machine which is that end remote from pulley 3.

Secured to the front end of shaft 2 is a cylindrical cutter in the form of a hollow drum 8 which is concentric with the axis of shaft 2. The forward circular cutting edge 9 of this drum has its outer side contacted by a sharpening disc 10 of emery or other suitable material while another sharpening disc 11 engages the inner side of the cutting edge 9. Disc 10 has a shaft 12 rotatable in a cross head 13. To this shaft are secured collars 14 which insure sliding movement of the cross head with shaft 12. Rods 15 extend from frame 1 and are slidably engaged by the cross head, there being springs 16 on the rods which thrust against the cross head so as to hold the sharpening disc 10 pressed yieldingly against the outer side of the cutting edge 9.

Sharpening disc 11 has a shaft 17 rotatable in a cross head 18 to which it is held by collars 19. Rods 20 extend from frame 1 and springs 21 are mounted on these rods so as to thrust outwardly against cross head 18. Thus the sharpening disc 11 is held yieldingly pressed against the inner side of the cutting edge 9.

A pulley 22 is secured to shaft 12 and another pulley 23 is secured to shaft 17. These pulleys are engaged by an endless belt 24 which receives motion from a large pulley 25 secured to shaft 2. Guide pulley 26 can be located wherever found desirable for holding the belt 24 in proper engagement with pulley 25.

Hingedly connected to the back portion of the top of frame 1 are parallel arms 27 and 28 in the forward ends of which is journaled a shaft 29 extending transversely of the machine. One end of this shaft has a gear 30 which meshes with another gear 31 secured to a shaft 32 which is journaled in bearings 33 extending from arm 27. A pulley 34 is secured to this shaft and receives motion through a belt 35 from another pulley 36 secured to shaft 2.

The two arms 27 and 28 are supported at their front ends by screws 37 which extend through and engage the sides of frame 1 at the top thereof. Obviously by means of these screws the arms 27 and 28 can be adjusted angularly relative to the frame 1 and about their pivots and hinge connections 38.

Secured to shaft 29 is a feed roller 39 which is substantially ellipsoidal, the uppermost portion of its periphery being supported parallel or substantially parallel with the corresponding portion of cutting edge 9. As shown particularly in Figures 1 and 4 this feed roller projects into the drum 8.

Additional arms 40 and 41 are connected to the back portion of frame 1 at 38 so as to swing upwardly and downwardly. The downward movement of these arms is limited by stop screws 42 carried by the arms and bearing downwardly on brackets 43 secured to the frame 1. Rods 44 are extended downwardly from arms 40 and 41 close to the screws 42 and are slidable in ears 45 projecting from the lower portion of frame 1. Springs 46 are mounted on these rods and are confined between ears 45 and adjustable washers 47 or the like carried by the lower end portions of the rods. Thus the springs act normally to push downwardly and cause the rods 44 to press screws 42 against the brackets 43.

Secured to the arms 40 and 41 is an arcuate shaft 48 which, as shown particularly in Figure 5, can be made elliptical in cross section. This shaft is substantially parallel with the top portion of the drum 8 and has mounted on it a series of rings 49. Recesses 50 are formed in the shaft 48 and contain coiled springs 51 which thrust downwardly against the respective rings so as to hold them normally positioned with their lower portions spaced from shaft 48 as shown in Figure 5. However, by thrusting upwardly against any one of the rings it will be permitted to shift upwardly a limited distance relative to its shaft and against the action of its spring 51.

Each of the rings 49 carries a presser roller 52 which is concentric therewith and is spaced therefrom by a suitable antifriction bearing indicated at 53.

As has already been stated a series of these rollers is mounted on the shaft 48 and as the shaft is substantially concentric with the upper portion of the drum 8 the series of rollers will also maintain substantially the same position.

A stationary table 54 is supported above frame 1 by brackets 55 or the like. This table extends close to the drum 8 and is flush with the adjacent portion of the periphery thereof.

Fixedly mounted within the drum is an arcuate guide or deflector 56. This is out of contact with the drum but is curved downwardly and forwardly from the upper portion of the drum as shown in Figure 4.

In practice the tire to be cut is split transversely at one point and the beads are cut off. One end portion of the tire is then spread sufficiently to permit its insertion between the feed roller 39 and the presser rollers 52. When the machine is in operation the drum 8 will rotate at a high speed while feed roller 39 will be driven at such speed as to direct the tire against the cutter as rapidly as desired. The roller 39 will support the tire with its fabric portion below and substantially parallel with the upper portion of the cutting edge 9. The presser rollers will adapt themselves automatically to the uneven or irregular outer surface of the tread and cause the tire to be held firmly on roller 39 directly in advance of the cutting edge. Thus the tire will be fed forwardly and the rotating cutter will sever the outer or tread portion from the inner or fabric portion. As shown in Figure 4 the outer or tread portion O of the tire T will move over the drum 8 on the table 54 while the inner or fabric portion F as it is split from the tread portion will be deflected downwardly and out of the machine by guide 56.

By means of the screws 42 the series of presser rollers can be brought to any desired normal positions relative to the cutting edge so as to adapt the apparatus to tires having treads of different thicknesses. By means of screws 37 the feed roller 39 can be raised or lowered to adapt the machine to different thicknesses of fabric portions to be removed.

The sharpening discs keep the edge 9 free from accumulations of rubber or the like and maintains it sharp at all times so that the cutting operation can be carried on without interruption.

What is claimed is:

1. The combination with a cylindrical cutter, of a feed roller extending into the cutter close to the cutting edge thereof, an arcuate presser shaft substantially parallel with the adjacent portions of the cutter and roller, and a series of separately spring-actuated rollers on the shaft and cooperating with the feed roller to grip material and feed it against the cutter.

2. The combination with a rotatable cylindrical cutter and a stationary guide therein, of means for feeding material against the rotating cutter to split said material and direct an outer layer across the cutter and an inner layer against the stationary guide.

3. The combination with a rotatable cylindrical cutter and a stationary guide therein, of means for feeding material against the rotating cutter to split said material and direct an outer layer across the cutter and an inner layer against the stationary guide, said means including a roller rotatable about an axis extending across the cutter, said roller projecting into the cutter, and an arcuate series of pressers shiftable radially independently of each other and cooperating with the roller to grip material in advance of the cutter.

4. The combination with a cylindrical cutter mounted for rotation, of a feed roller projecting into the cutter, means for rotating the roller about an axis extending across the cutter, an arcuate shaft and an arcuate series of presser members shiftable radially on the shaft independently of each other and cooperating with the roller for gripping material close to and in advance of the cutter and feeding said material against a portion of the cutter to split the material into inner and outer portions, and a stationary guide within the cutter for deflecting the inner portion of the split material out of the cutter.

5. The combination with a cylindrical cutter mounted for rotation, of means for spreading material and feeding it against the cutter so as to be split thereby into inner and outer layers, said means including a rotatable feed roller projecting into the space surrounded by the cutter, the periphery of said roller being curved in the direction of the length of the roller, and an arcuate presser cooperating with the roller for advancing material against the edge of the cutter, said presser including an arcuate shaft, separate rollers carried by the shaft and slidable thereon toward and from the feed roller, and yielding means housed in the respective roller for holding the presser rollers normally pressed toward the feed roller.

6. The combination with a cylindrical cutter mounted for rotation, of an ellipsoidal feed roller projecting into the cutter and rotatable about an axis extending transversely of the cutter, an arcuate shaft, an arcuate series of presser rollers upon and slidable radially of the shaft, springs housed in the respective presser rollers for pressing them independently toward the feed rollers, said presser rollers cooperating with the feed roller for advancing material against the cutter, yielding means for holding said series normally in a predetermined position relative to the feed roller, and means for adjusting said series relative to the feed roller.

In testimony that I claim the foregoing as my own, I have hereto affixed my signature.

WILFRED GUY FRITTS.